United States Patent
Wang et al.

(10) Patent No.: US 8,311,198 B2
(45) Date of Patent: Nov. 13, 2012

(54) METHOD FOR PROCESSING TELEPHONE CALL

(75) Inventors: Zhengwei Wang, Shenzhen (CN); Qian Sun, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1002 days.

(21) Appl. No.: 11/571,229

(22) PCT Filed: Apr. 29, 2006

(86) PCT No.: PCT/CN2006/000861
§ 371 (c)(1), (2), (4) Date: Nov. 5, 2007

(87) PCT Pub. No.: WO2006/116932
PCT Pub. Date: Nov. 9, 2006

(65) Prior Publication Data
US 2008/0056474 A1    Mar. 6, 2008

(30) Foreign Application Priority Data

Apr. 30, 2005   (CN) .......................... 2005 1 0034529

(51) Int. Cl.
*H04M 3/42* (2006.01)
(52) U.S. Cl. ......... 379/202.01; 379/211.01; 379/211.02; 379/93.23; 379/88.19; 379/199
(58) Field of Classification Search ............. 379/202.01, 379/211.02, 93.23, 88, 199, 67.1, 70, 88.19, 379/211.01
See application file for complete search history.

(56) References Cited

U.S. PATENT DOCUMENTS

| | | | |
|---|---|---|---|
| 4,893,329 A * | 1/1990 | O'Brien | 379/88.23 |
| 5,864,612 A | 1/1999 | Strauss et al. | |
| 5,872,840 A * | 2/1999 | Wu | 379/197 |
| 6,359,970 B1 * | 3/2002 | Burgess | 379/67.1 |
| 2001/0036258 A1 * | 11/2001 | Sugla | 379/211.01 |

(Continued)

FOREIGN PATENT DOCUMENTS

| | | |
|---|---|---|
| CN | 1487684 A | 4/2004 |
| CN | 1538723 A | 10/2004 |
| CN | 1677993 A | 10/2005 |
| WO | WO 01/61978 A2 | 8/2001 |

OTHER PUBLICATIONS

Supplementary European Search Report issued in European Patent Application No. EP 06 74 1767 dated May 11, 2007.

(Continued)

*Primary Examiner* — Joseph J Nguyen
(74) *Attorney, Agent, or Firm* — Slater & Matsil, L.L.P.

(57) ABSTRACT

A method for processing telephone call includes: access number configuration information corresponding to a called number is stored in an access number configuration equipment in a communication system; the calling party requests for the pre-call registration in the communication system, the communication system adds a corresponding pre-call registration record into a pre-call registration list according to the access number configuration information; the calling party initiates the call to the called party, after the communication system receives the call request of the calling party and before calling the called party, the communication system determines whether the calling party has been registered in the pre-call registration list, if the calling party has been registered, connects the call request and initiates the call to the called party; otherwise, refuses to initiate the call to the called party. In the method for processing telephone call according to the present invention, it is ensured that a called party would not miss important incoming calls when he does not want to be disturbed. A calling party can request for the pre-call registration by means of short message or Internet so as to call the called party.

21 Claims, 5 Drawing Sheets

U.S. PATENT DOCUMENTS

| | | | |
|---|---|---|---|
| 2003/0152198 A1 | 8/2003 | Price | |
| 2004/0008666 A1* | 1/2004 | Hardjono | 370/352 |
| 2004/0234061 A1 | 11/2004 | Koch et al. | |
| 2004/0247106 A1* | 12/2004 | Mullis et al. | 379/211.02 |
| 2005/0025294 A1* | 2/2005 | Matsuhashi et al. | 379/88.17 |
| 2005/0169446 A1* | 8/2005 | Randall et al. | 379/93.23 |
| 2005/0243987 A1* | 11/2005 | Polouchkine et al. | 379/201.01 |
| 2006/0062358 A1* | 3/2006 | Pearson et al. | 379/88.2 |

OTHER PUBLICATIONS

Written Opinion of the International Searching Authority, International Application No. PCT/CN2006/000861, Date of mailing: Aug. 17, 2006, 6 pages.

$1^{st}$ Chinese Office Action, Chinese Application No. 200510034529.6, Date of mailing: Jul. 25, 2008, 12 pages.

$1^{st}$ European Office Action, European Application No. 06 741 767.5-2414, Dated: Dec. 9, 2008, 3 pages.

$2^{nd}$ Chinese Office Action, Chinese Application No. 200510034529.6, Date of mailing: Apr. 3, 2009, 8 pages.

$2^{nd}$ European Office Action, European Application No. 06 741 767.5-2414, Dated: Oct. 13, 2009, 4 pages.

Chinese Rejection Decision, Chinese Application No. 200510034529.6, Date of mailing: Oct. 23, 2009, 16 pages.

$1^{st}$ Indian Office Action, Indian Application No. 3923/KOLNP/2006, Dated: Aug. 11, 2010, 2 pages.

* cited by examiner

METHOD FOR PROCESSING TELEPHONE CALL

FIELD OF THE INVENTION

The present invention relates to the communication technology field, and particularly to a method for processing telephone call.

BACKGROUND OF THE INVENTION

With the development of the communication technology, fixed phones and mobile phones are increasingly popular, and have become an indispensable part of people's life and work. Today, information becomes more and more important. People have gradually given up the communication manner of letter, which takes a relatively longer time, and turn to use other manners such as telephone to obtain information and improve relationship quickly and conveniently. While the telephone brings convenience to people, many people feel the annoyance brought by modern civilization into daily life to some extent. For example, it is not hard to imagine how people will response when a raspy telephone ring bursts in a still night. Calls in improper time would affect people's life and work unavoidably, particularly some un-emergent calls, especially harassing calls, would seriously affect people's daily life, both physically and mentally.

For avoiding the above problems, powering off is the simplest way. But if the telephone is powered off, the user could not answer any incoming call, including the call from the relatives and friends, and may miss some emergent calls which are very important for the user. Also, after the telephone is powered off, the user easily forgets to power it on when he needs to answer a call, for example, if the connection line of the fixed phone is pulled out last night, a user easily forgets to connect the line with the fixed phone in the next day, which would affect the user for answering some necessary calls. Therefore, although this method is simple, it is extremely inconvenient for the user.

Now for the mobile communication, a service named secretary system is provided. When the mobile phone number of the called party subscribing this service is dialed, if the called party does not want to be disturbed by the phone call, the secretary system would its prompt the calling party to leave message and inform the called party by short message etc. In this situation, the called party could decide whether to call back according to the message left by the calling party. The called party might not call back for unimportant call and could call back for the important call at convenient time, which ensures that the called party will not be disturbed by the incoming call in a given period. A user needs to pay for this way, and the called party usually could not deal with some emergent affairs in time because the secretary system informs the called party by changing the incoming call from the calling party into short message which may be delayed or even be lost. In addition, under the condition of one-way charge for mobile communication, the payout of the called party would be increased for calling back, therefore this method is also inconvenient for the called party.

To solve the problem of call disturbance, another method is the incoming call filtering. When a user does not want to be disturbed by unimportant calls, the user could inform the communication carrier providing this service to allow connection of the calls from certain calling numbers, and refuse to connect the calls from other calling numbers except for these specified calling numbers. In this manner, the user needs to set the calling number frequently, and if too many calling numbers are set, the connecting time would be prolonged, which is still inconvenient for the user.

SUMMARY OF THE INVENTION

According to one aspect of the invention, a method for processing telephone call which is used to limit an incoming call is provided, so that a communication system limits the incoming call according to an access number which is set by the called party rather than according to a calling number.

According to another aspect of the invention, a method for processing telephone call is provided, the method includes:

storing access number configuration information corresponding to a called number in a communication system;

setting a pre-call registration list in the communication system and adding a corresponding record into the pre-call registration list according to the access number configuration information on receiving a registration request from a calling party;

determining whether the calling party has been registered in the pre-call registration list on receiving a call request from a calling party, if the calling party has been registered, connecting the call request and initiating the call to the called party; otherwise, refusing to initiate the call to the called party.

It can be seen from the embodiments of the present invention that the called party can enable the function of access number call by setting the access number configuration information while he does not want to be disturbed by the incoming call, thereby each calling party is required to input the access number, if the calling party doesn't obtain the correct access number information from the called party, the incoming call from the calling party will not be connected to the called party, thereby the called party is ensured not to be disturbed by some unimportant incoming calls or harassing calls while he doesn't want to be disturbed, the relatives or friends of the called party can obtain the correct access number information from the called party, thus they can still contact the called party by telephones, thereby the called party is ensured not to miss the incoming call that he wants to answer.

Also, by setting the access number, the user can replace the calling group without changing the telephone number. For example, when he often receives harassing calls, the user can prohibit the harassing calls by setting the access number. If the calling party of the harassing call knows the access number of the called party, the called party needs only to modify the access number configuration information and not to change the actual telephone number, thereby the harassing calls are effectively prohibited and the normal work and life of the user are ensured.

According to embodiments of the present invention, the called party can divide the calling parties into groups and allocate different access numbers to different groups, thereby can control the quantity of the incoming calls flexibly. Also, the allowed period of the access number call can be flexibly controlled by setting the scene status parameters of the called party.

Furthermore, according to embodiments of the present invention, the process that the calling party requests for pre-call registration and the process that the calling party calls the called party are two communication processes independent of each other, so that the calling party can request for pre-call registration by flexible means, such as short message or Internet, and obtain the right to call the called party.

To sum up, the method for processing telephone call according to one embodiment of the present invention conveniently ensures the called party will not be annoyed and will not miss important incoming calls when he does not want to be disturbed.

DETAILED DESCRIPTION OF THE EMBODIMENTS

Hereinafter, the present invention will be further detailed with reference to the accompanying drawings and the specific embodiments.

Figure 1:
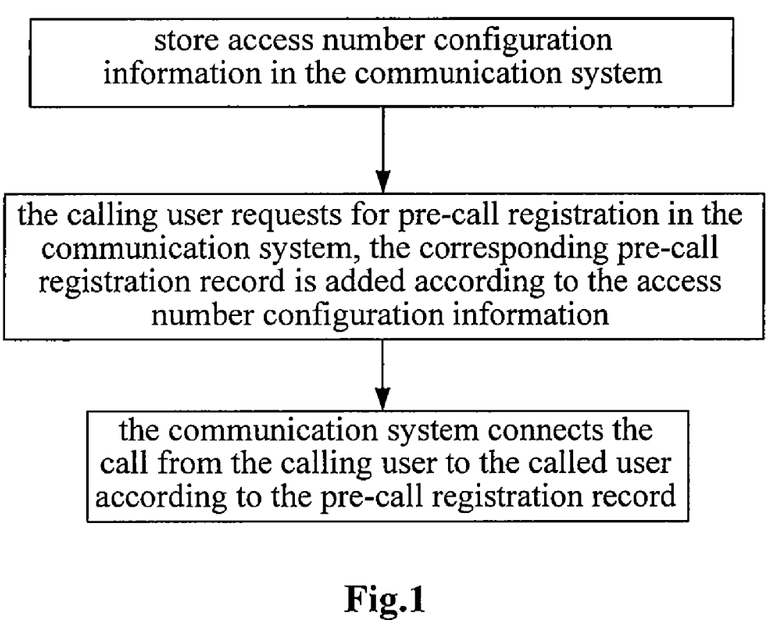
FIG. 1 is a simplified flow chart of a method for processing telephone call according to the embodiments of the present invention.

With reference to FIG. 1, the method for processing telephone call according to one or more embodiments of the present invention includes the following process:

The called party stores the access number configuration information corresponding to the called number in an access number configuration equipment of the communication system;

The calling party requests for the pre-call registration in the communication system, the communication system adds the corresponding pre-call registration record into the pre-call registration list according to the access number configuration information which is set by the called party;

The call connection process of the calling party: after the communication system receives the call request from the calling party, the communication system checks and determines whether the calling party has been registered in the pre-call registration list before it initiates the call to the called party, if the calling party has been registered, initiates the call to the called party; otherwise, refuses to initiate the call to the called party.

In order to ensure the telephone user not to be disturbed by too many calls and not to miss some important calls, a simplified implementation of an embodiment of the present invention is to set an access number for the called party, the access number can be a digital or a character string, and the called party number and the corresponding access number are the basic access number configuration information. When the called party uses an access number to allow a call connection, the calling party can call the called party after the pre-call registration with the access number of the called party. The called party can further set the access number configuration information as follows: namely, different periods are set with corresponding access numbers, so that when the called party subscribing the access number service is called within the specific period which is set by the called party, the communication system requires the calling party to input the access number information corresponding to the current time and creates a record in the pre-call registration list, when the calling party calls the called party, the communication system further connects the call from the calling, party only after it confirms that the calling party has been registered. Hereinafter, the detailed implementation process of the present invention is described with reference to specific embodiments.

Embodiment 1

Figure 2:
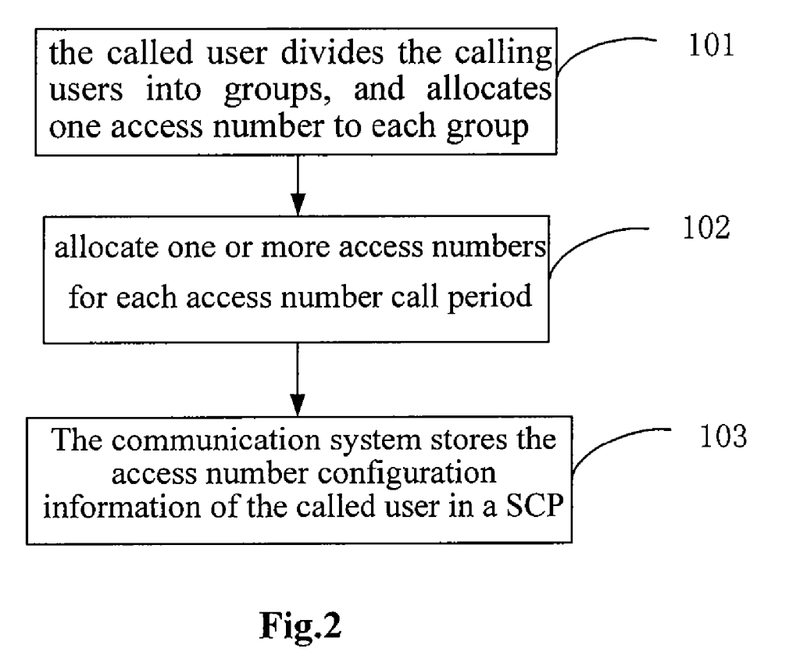
FIG. 2 is a simplified flow chart of setting the access number information according to the first embodiment of the present invention.
Figure 3:
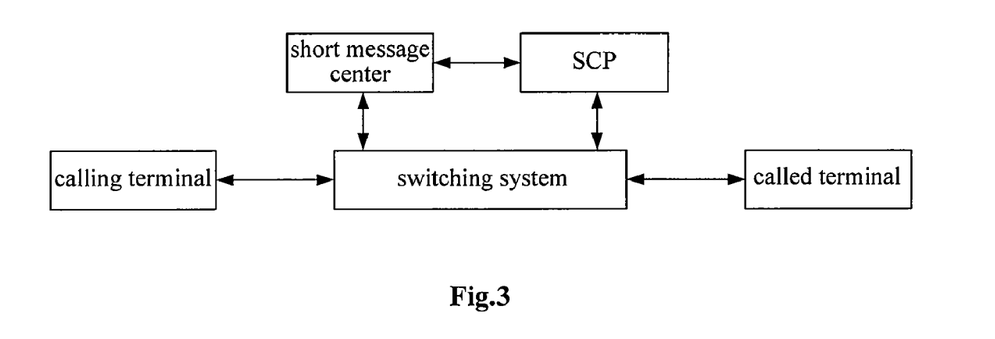
FIG. 3 is a simplified block diagram of system structure according to the first embodiment of the present invention.

The process of setting access number configuration information by the called party is described. FIG. 2 and FIG. 3 show the flow chart of setting access number configuration information according to the embodiment of the present invention.

In step 101, the called party sets a plurality of access numbers in the access number configuration information and sets a name for each access number. The setting can base on the type of the calling parties, and different access numbers can be allocated to different groups of calling parties respectively. For example, the access number of family is 666668, the access number of relatives and friends is 222223, the access number of colleagues is 345678. The called party can also set a temporary access number for the calling party for temporary usage, such as 223566, in order that the called party can answer the incoming call in a specific period, and the temporary access number can be deleted by the called party at any time.

In step 102, the called party sets one or more access numbers for each call period of access number, i.e. allocates the access numbers which are set in step 101 to different periods, for example, the access number of 666668 is set for the period of 00:00:00-07:00:00, two access numbers of 666668 and 222223 are set for the period of 23:00:00-24:00:00, three access numbers of 666668, 222223 and 345678 are set for the period of 07:00:00-23:00:00. Similarly, the called party can also set holiday access number configuration information corresponding to holidays in order that the called party can answer the incoming call optionally. After step 102, the correspondence list of access number configuration information as follows is formed.

List.1 Basic Information in Access Number Configuration Information

| Called Number | Access number Name | Access number |
|---|---|---|
| 13048907033 | family | 666668 |
| 13048907033 | relatives and friends | 222223 |
| 13048907033 | colleagues | 345678 |
| 13048907033 | temporary | 223566 |

List.2 Correspondence Information Between Access Number and Call Period in Access Number Configuration Information

| Called Number | Beginning time of call | Ending time of call | Access number |
|---|---|---|---|
| 13048907033 | 00:00:00 | 07:00:00 | 666668 |
| 13048907033 | 23:00:00 | 24:00:00 | 666668, 222223 |
| 13048907033 | 07:00:00 | 23:00:00 | 666668, 222223, 345678 |

Wherein, in list.2, the column of "access number" can also be "access number name". In addition, the above two lists can also be integrated into one list, but it is not convenient for the called party to maintain access number information. The access number configuration information can also be implemented by the following list.

List.3 Access Number Configuration Information

| Called Number | Access number Name | Access number | Beginning time of call | Ending time of call |
|---|---|---|---|---|
| 13048907033 | family | 666668 | 00:00:00 | 24:00:00 |
| 13048907033 | Relatives and friends | 222223 | 07:00:00 | 13:30:00 |
| 13048907033 | Relatives and friends | 222223 | 13:30:00 | 22:00:00 |
| 13048907033 | colleagues | 345678 | 09:00:00 | 20:00:00 |

After the access number configuration information as shown in list.1 and list.2 or list.3 is created, in step 103, when the called party applies for subscribing the access number call service, the access number configuration equipment in the communication system, such as the service control point (SCP) of intelligent network, records the access number configuration information of the called party.

It should be noted that, after the called party sets the access number configuration information, the calling party needs to be informed of the corresponding access number in order to input the correct access number according to the called party and the current call period of the access number when being prompted to input the access number by the communication system. In order that the called party can inform the corresponding calling party promptly and conveniently after firstly setting or modifying the access number, the directory information of the corresponding access number can be saved in the access number configuration information, as shown in list.4.

List.4 Directory Information of Access Number

| Called Number | Calling Number | Access number |
|---|---|---|
| 13048907033 | 26661061 | 666668 |
| 13048907033 | 13760463639 | 222223 |
| 13048907033 | 13631576005 | 345678 |
| 13048907033 | 13631576001 | 345678 |

After the user sets or modifies the access number, the access number configuration equipment sends short message including the called number and the access number to the corresponding calling number automatically. Of course, the called party also can send the access number to the corresponding calling number by sending short message through the directory or the short message system provided by the Internet.

The calling party requests for the pre-call registration in the communication system. The communication system adds the corresponding pre-call registration record into the pre-call registration list.

Figure 4:
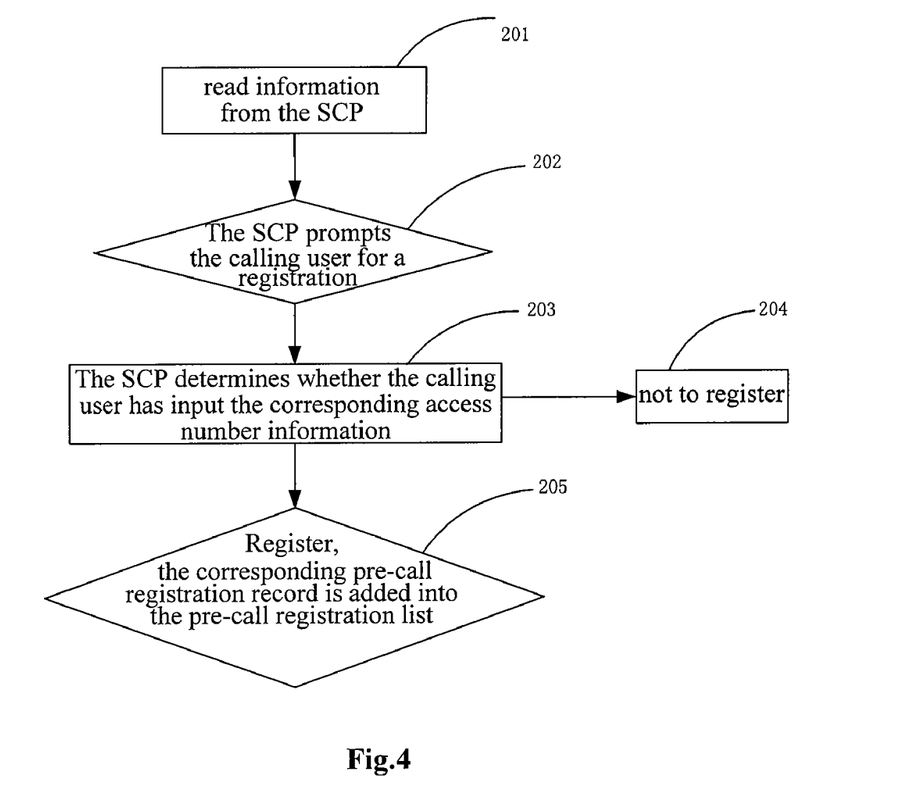
FIG. 4 is a simplified flow chart of the pre-call registration according to the first embodiment of the present invention.

With reference to FIG. 4, in step 201, when the switching system receives a call connection request from the calling party, the switching system reads information of the called party from the SCP, if the called party has subscribed the access number call service, performs step 202; otherwise, directly connects the incoming call.

In step 202, when detecting that the calling party has not been registered in the pre-call registration list, the SCP prompts the calling party to request for the pre-call registration through playing voice prompt via an IP (Intelligent Peripheral); and at the same time, the SCP may send short message to the calling party through the short message center, or prompt the calling party to request for the pre-call registration by means of Unstructured Supplementary Service Data (USSD). The format description of pre-call registration command is included in the short message so that the calling party needs only to reply the short message without memorizing the short message service number of the access number service;

In step 203, the calling party sends the calling number, the access number and the called number by means of short message, and the short message center forwards the content of the short message sent by the calling party to the SCP, if the SCP receives the short message including the above contents from the calling party and these contents are same as the access number configuration information which is set by the called party, the SCP performs step 205. The SCP performs the pre-call registration for the calling party, adds the corresponding pre-call registration record into the pre-call registration list and waits for the following call connection process. If the calling party does not provide all the above information or the calling party provides all the above information but at least one of the above information is not same as the access number configuration information which is set by the called party, the SCP performs step 204. The SCP does not perform the pre-call registration for the calling party and at the same time may prompt the calling party about the pre-call registration failure by means of short message.

For the called party whose access number configuration information includes the call period of access number and the corresponding access number, in step 201, after the switching system receives the call request from the calling party, the switching system reads the access number configuration information in the SCP and determines whether the current call time belongs to the call period of access number in the access number configuration information; if it does, performs step 202; otherwise, the communication system returns the information of pre-call registration request failure to the calling party. When performing the pre-call registration for the calling party, the SCP can record the registration time and set the allowed call period, the allowed call period can be preset by the system, such as 10 minutes or longer. The registration also can be set to be allowed in that very day, and the corresponding pre-call registration record is added into the pre-call registration list.

List.5 Content of Pre-Call Registration List

| Calling Number | Called Number | Right for call | Pre-call registration time | Allowed call period |
|---|---|---|---|---|
| 133123xxxxx | 13212xxxxxx | Call permitted | 2005/4/21:1:1:1 | 2005/4/21:1:6:1 |
| 135367xxxxx | 13212xxxxxx | Call permitted | 2005/3/28:8:1:1 | 2005/3/28:8:6:1 |
| 135346xxxxx | 13211xxxxxx | Super access | — | — |

A second is a measure of the pre-call registration time. The allowed call period can be the deadline before which the calling party can call after this registration. The format of the allowed call period is the same as the pre-call registration time and also can be a duration value indicating the time length, such as 5, and its unit is a minute. The pre-call registration list may also not include the field of allowed call period, and the SCP directly determines whether the call time of the calling party exceeds the allowed call period according to the pre-call registration time and the allowed call period preset by the system, such as time length or allowed in that very day. If the calling party calls the called party in the allowed call period, the process of call connection is performed; otherwise, the connection will not be performed.

In an intelligent network, the telephone voice interaction, instead of the short message, may be adopted to prompt the calling party to input the corresponding access number information. When the calling party calls the called party, the switching system triggers the intelligent service in the Service Control Point (SCP). The SCP controls the voice interaction between the Intelligent Peripheral (IP) and the calling party, obtains the corresponding information, such as the access number etc. inputted by the calling party, then, the SCP decides whether to perform pre-call registration according to the information inputted by the calling party, and can prompt the calling party whether the pre-call registration is successful or not by means of telephone voice interaction.

In addition, for the calling party who knows the called party is a subscriber of the access number service, the calling party can directly request for the pre-call registration before calling the called party, such as directly send a short message which includes the called number and the access number to the corresponding short message service number of the access number service to request for the pre-call registration through the above step 203, and dials the called number after successful registration. Besides through short messages, the pre-call registration can also be performed through Internet. The called number and the access number inputted by the calling party through a web page are submitted to a WEB application server, and the WEB application server sends them to the SCP to perform the pre-call registration.

the call connection process for the calling party.

After the switching system receives the call request from the calling party, the switching system triggers the intelligent service to the Service Control Point (SCP) according to the called number. The SCP reads the pre-call registration record of the called party, and checks whether the calling party has been registered in the pre-call registration list, if the calling party has been registered, the SCP indicates the switching system to initiate the call to the called party, otherwise, the SCP indicates the Intelligent Peripheral (IP) to play prompt voice of "can not connect" or busy tone etc.

The above method is a relatively simple connection method. The following method which is more complex can also be adopted: with reference to FIG. 5, in step 301, after the switching system receives the call request from the calling party, the switching system triggers the intelligent service to the Service Control Point (SCP) according to the called number, and the SCP reads the access number configuration information, such as the information about the access number and the corresponding beginning time of the call and ending time of the call etc. which are set by the called party, as shown in list.2 or list.3. Then step 303 is performed. The SCP determines whether the current call time is within the call period corresponding to the access number provided by the calling party. If the current call time is not within any call period in the access number configuration information of the called party, step 307 is performed, i.e. the SCP implements the function of not restricting the call within a certain period, for which the called party sets no corresponding access number, by indicating the switch system to connect the call request from the calling party. If the current call time is within the call period of access number corresponding to the access number provided by the calling party, step 304 is performed.

Figure 5:
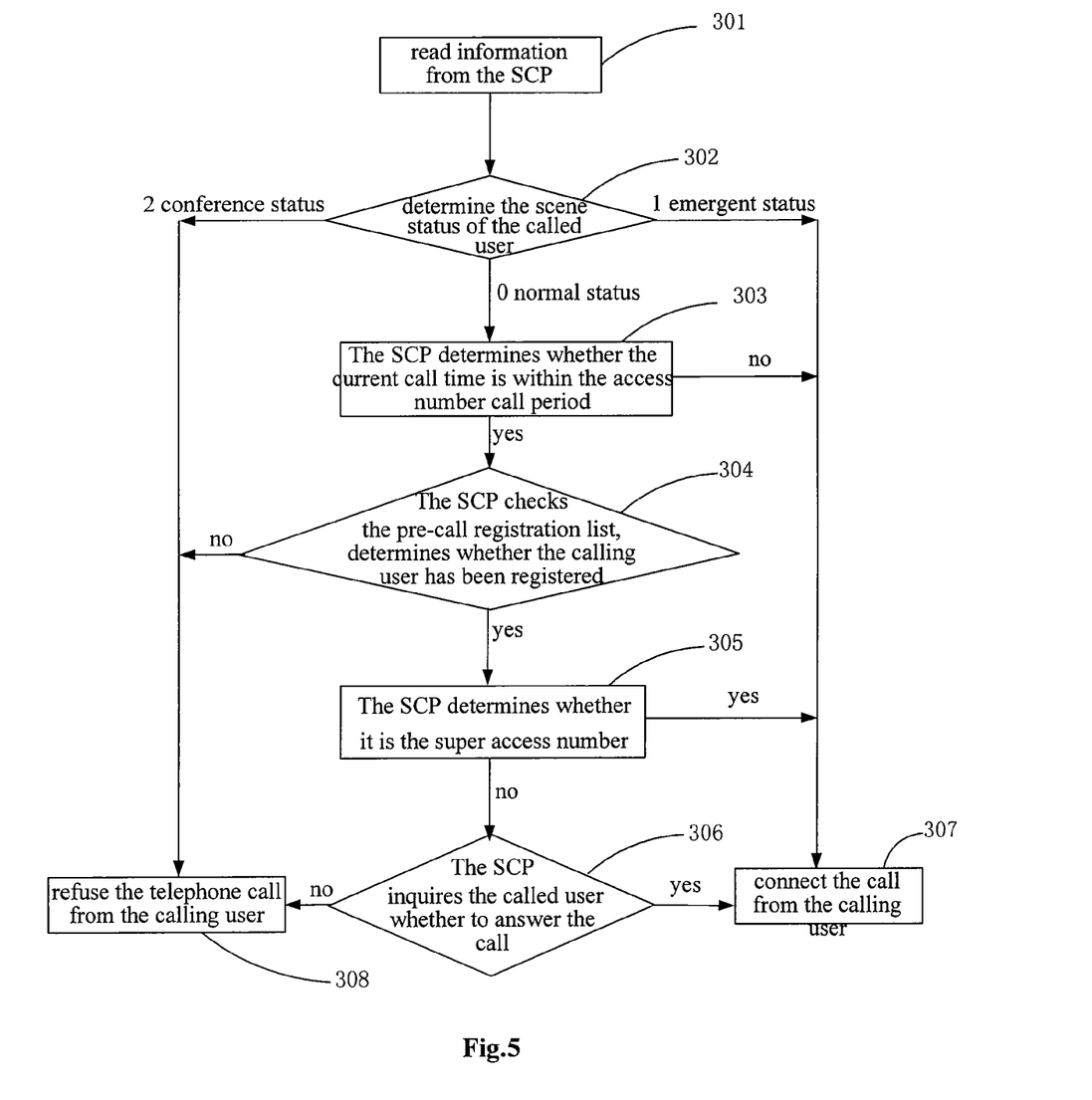
FIG. 5 is a simplified flow chart of processing an access number telephone call according to the first embodiment of the present invention.

In step 304, the SCP reads the information in the pre-call registration list. A format of the pre-call registration list is shown in list.5. The SCP checks the record content of the pre-call registration list. For example, when the calling party of number 13312xxxxxx calls the called party of number 13212xxxxxx, the record information in the pre-call registration list read out by the SCP is that between 01:01:01 Apr. 21, 2005 and 01:06:01 Apr. 21, 2005, the right for the call from the calling party to the called party is "Call permitted", and the call to the called party who subscribes the access number call service at other time is not permitted. If the allowed call period set by the system is that very day, the SCP determines whether the current call date is the same as the date in the above registration time according to the pre-call registration time recorded in the pre-call registration list, such as 01:01:01 Apr. 21, 2005, so that the calling party can perform registration once and call the called party many times in that very day. If the current call date is the same as that in the registration time, step 305 is performed for the call request from the calling party; otherwise, the SCP performs step 308, refuses to initiate the call to the called party. In the determining process, the SCP can prompt whether the calling party can initiate the call to the called party by means of short messages or telephone voice interaction.

In step 305, after confirming that the calling party has been registered, the SCP also can determine whether the calling party uses the super access number to perform registration, namely, whether the field of right for call in the pre-call registration list is "super access number" or not. If it is, step 307 is performed. The SCP connects the call request from the calling party directly. Otherwise, step 306 is performed. In addition, the SCP can also directly check and determine whether the calling party uses the super access number to perform registration after step 301. If the calling party does, step 307 is performed, the SCP directly indicates the switching system to connect the call request from the calling party.

In step 306, the SCP will inquire whether the called party wants to answer the incoming call from the calling party by means of short messages or telephone voice interaction. If the information returned from the called party is yes (such as, the called party informs the SCP by means of short messages), step 307 is performed, the SCP indicates the switching system to connect the call request from the calling party. If the called party returns the information showing that he is unwilling to answer the call now, step 308 is performed, the SCP refuses to initiate the call to the called party.

Figure 6:
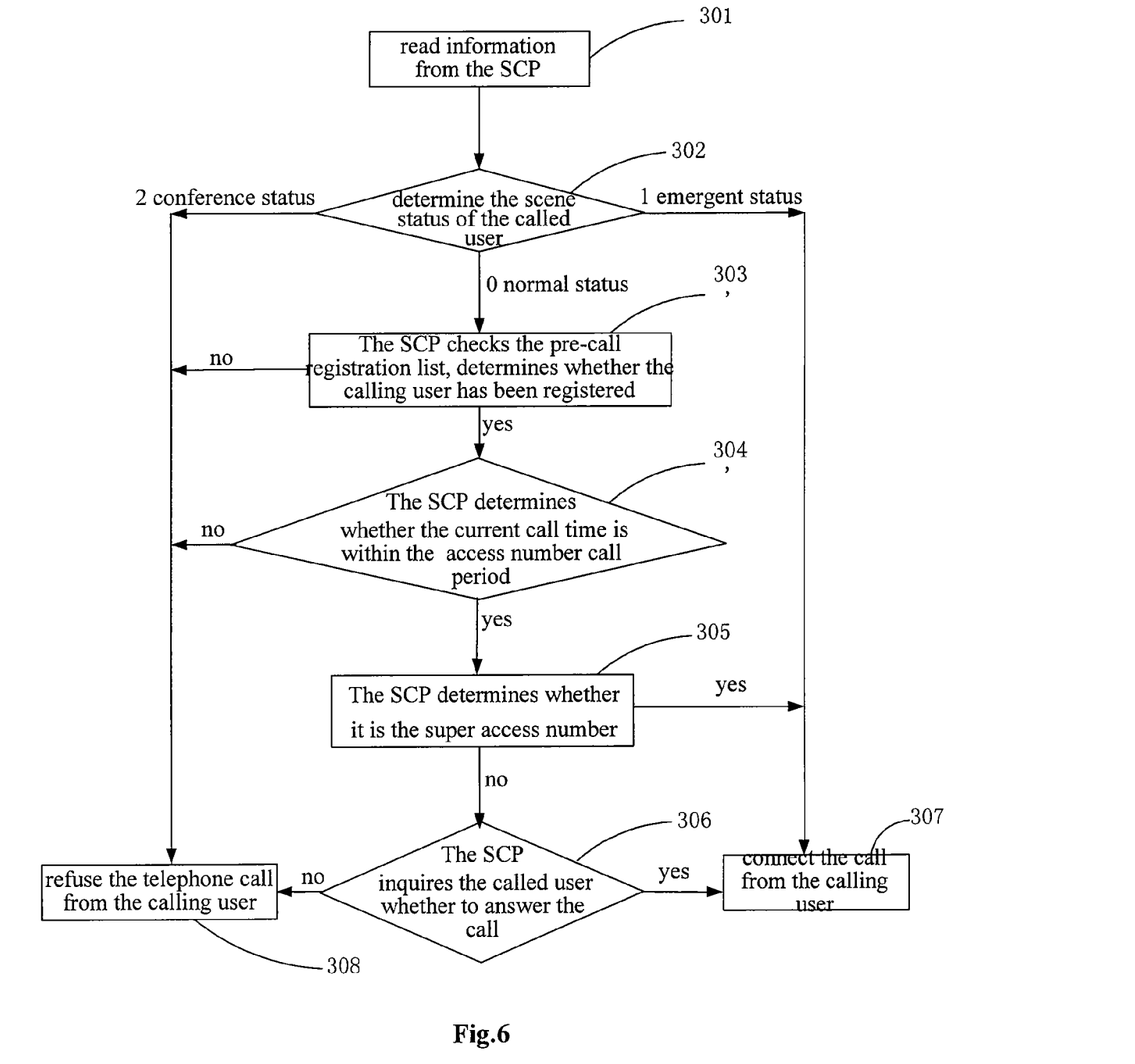
FIG. 6 is a simplified flow chart of another processing of an access number telephone call according to the first embodiment of the present invention.

In the embodiment 1, the call connection process for the calling party also can be performed in the manner shown in FIG. 6. Whether the calling party has been registered in the pre-call registration list is determined, namely, step 303'. Then whether the current call time is within the call period of access number in the access number configuration information is determined, namely, step 304'. Step 304' is optional. If it has been determined whether the current call time is within the call period of access number in the access number configuration information in the above step 201, step 304' is not needed here. After the communication system performs step 301, the communication system performs step 303 directly, namely, the SCP reads the record information in the pre-call registration list, and determines whether the calling party has been registered in the pre-call registration list. If the calling party has been registered in the pre-call registration list, step 304' is performed. If the calling party has not been registered in the pre-call registration list, the SCP refuses to initiate the call to the called party. The SCP prompts the calling party about the call connection failure, and then prompts the calling party to request for the pre-call registration by means of short message or telephone voice interaction. In step 304', the SCP determines whether the current call time belongs to the call period corresponding to the access number provided by the calling party in the access number configuration information. If it does not, the SCP refuses to initiate the call to the called party; if it does, the SCP performs the next step 305, thus continues to perform the following flow.

In the embodiment 1, the super access number can be set to be effective in any call period of access number by the system, and the call period of access number need not be set solely for the super access number. For example, the access number 666668 shown in the list.1 can be set as a super access number. A field is set in the access number configuration information list to identify whether the access number is a super access number which is effective at any time. In this case, the called party can tell families and relatives such as parents or children etc. about the super access number, so that the called party can answer the call from the calling party who uses the super access number in any circumstances, which is quite convenient for the called party and the calling party who uses the super access number.

As we can see from the above embodiment, the called party can effectively reduce the disturbance of calls by setting the access number configuration information, and avoid those calls which connect with the called party by changing telephone number and evading call restriction such as a harassing call, at the same time the called party will not miss the call from the relatives and friends which he wants to answer. The process of setting access number by the called party is also simple and convenient, therefore the present invention provides great convenience for the user.

In order that the called party controls the call connection by using access number more conveniently, in this embodiment, a scene status parameter of the called party can be provided to set the corresponding operation status of the called party. Before the calling party calls the called party, the scene status parameter of the called party is added into the access number configuration information which is set by the called party.

After step 301, step 302 is added. The SCP determines the scene status parameter of the called party. For example, if the scene status parameter is 0, that means the called party has turned on the function of access number call, then step 303 is performed for the call request directly; if the scene status parameter is 1, that means the called party only wants to answer those especially emergent incoming call, such as the incoming call of the super access number, then the SCP performs step 307 and connects the call directly; if the scene status parameter is 2, that means the called party is in conference status or other status in which he does not want to answer the incoming call, the SCP performs step 308 for the incoming call directly, namely, refuses to initiate the call to the called party, at this moment, all the incoming calls will not be connected.

Embodiment 2

As above, the present invention has been described with reference to the embodiment of subscribing the function of access number call in the intelligent network, those skilled in the art should understand that the present invention can be applied to NGN and 3 G communication system.

Figure 7:
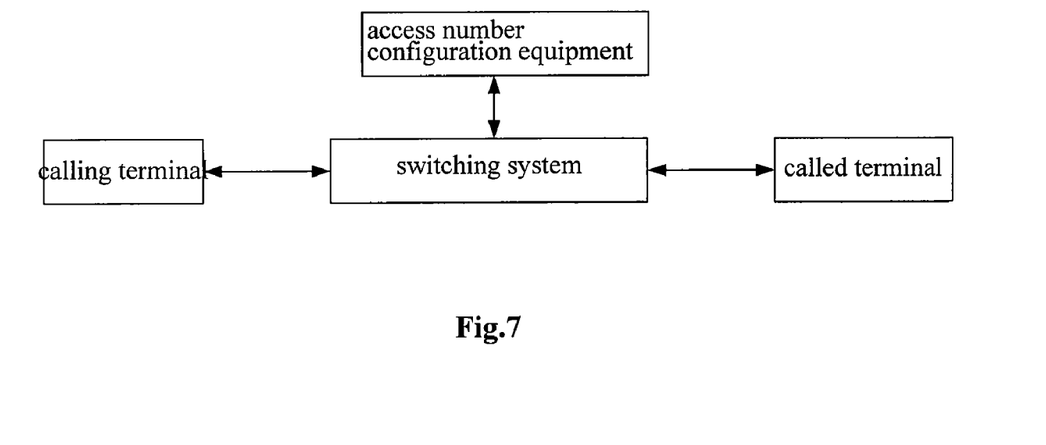
FIG. 7 is a simplified block diagram of system structure according to the second embodiment of the present invention.

FIG. 7 is a block diagram of the system structure when the present invention is applied to the NGN and 3 G communication system based on IPv6.

In the NGN and 3 G communication system, the task of the SCP in embodiment 1 is accomplished by a dedicated access number configuration unit, for example, the access number configuration unit can be provided in the dedicated server, or provided in a switch directly. The called party stores the corresponding access number configuration information in the dedicated server or the switch.

The calling party requests for the pre-call registration in the switch or the dedicated server by means of Internet, WAP or short message etc. The switch or the dedicated server adds the corresponding pre-call registration record into the pre-call registration list. The pre-call registration can record not only the calling number but also the calling IP address or the user identifier.

When the calling party calls the called party, the switching system obtains the pre-call registration record in the switch or the dedicated server by means of IP protocol, determines whether the calling party has been registered in the pre-call registration list, and then performs or terminates the following call connection process.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

What is claimed is:

1. A method for processing telephone call, the method comprising:

storing, in a communication system, access number configuration information corresponding to a called number, wherein the access number configuration information comprises correspondence information between a calling number of a calling party, an access number, and the called number;

sending, by the communication system, the called number and the access number to the corresponding calling number according to the access number configuration information;

upon receiving a pre-call registration request from the calling party, determining whether the pre-call registration request is consistent with the access number configuration information corresponding to the called number, and if yes, adding a corresponding record into a pre-call registration list set in the communication system, otherwise, returning a pre-call registration failure to the calling party, wherein the pre-call registration request includes the access number corresponding to the called party, and wherein the access number is different from the called number; and determining, by the communication system, whether the calling party has been registered in the pre-call registration list on receiving a call request from a calling party, if the calling party has been registered, connecting the call request and initiating the call to the called party; otherwise, refusing to initiate the call to the called party, wherein, the access number configuration information further comprises the correspondence information between an access number call period and an access number; and the process of adding a corresponding record into the pre-call registration list according to the access number configuration information on receiving a pre-call registration request from a calling party further comprises:

determining whether the current time belongs to the call period corresponding to the access number according to the access number configuration information; if it does, adding the corresponding record into the pre-call registration list; otherwise, returning information of pre-call registration failure to the calling party.

2. The method of claim 1, wherein,
the access number configuration information further comprises the correspondence information between an access number call period and an access number; the method further comprises:
before initiating the call to the called party, determining whether the current time belongs to the access number call period according to the access number configuration information; if it does, further checking and determining, by the communication system, whether the calling party has been registered in the pre-call registration list; otherwise, connecting the call request and initiating the call to the called party.

3. The method of claim 2, wherein,
a super access number, through which a call connection can be processed in any access number call period, is set in the access number configuration information.

4. The method of claim 1, wherein,
the access number configuration information further comprises the correspondence information between an access number call period and an access number;
the method further comprises: after determining the calling party has been registered, further determining whether the current time belongs to the access number call period according to the access number configuration information; if it does, connecting the call request and initiating the call to the called party; otherwise, refusing to initiate the call to the called party.

5. The method of claim 4, wherein,
a super access number, through which a call connection can be processed in any access number call period, is set in the access number configuration information.

6. The method of claim 1, wherein, a super access number, through which a call connection can be processed in any access number call period, is set in the access number configuration information.

7. The method of claim 1, wherein,
the pre-call registration request from the calling party is received by means of short message, telephone voice interaction or web pages, the pre-call registration request comprises the calling number, the called number and the access number.

8. The method of claim 1, further comprising:
setting an allowed call period in the pre-call registration list, if the calling party has been registered in the pre-call registration list and the call request is received in the allowed call period, initiating the call to the called party; otherwise, refusing to initiate the call to the called party.

9. The method of claim 1, wherein,
if it is determined that the calling party has not been registered in the pre-call registration list, the communication system prompts the calling party about the connection failure, and prompts the calling party to request for the pre-call registration by means of short message or telephone voice interaction.

10. The method of claim 1, wherein,
after it is determined that the calling party has been registered in the pre-call registration list and before initiating the call to the called party, the method further comprises: inquiring, by the communication system, the called party whether to answer the call from the calling party; if the called party returns a message of agreement, initiating the call to the called party, otherwise, refusing to initiate the call to the called party.

11. The method of claim 10,
wherein, the communication system inquires the called party whether to answer the call from the calling party by means of short message or telephone voice interaction.

12. The method of claim 10, further comprising,
after it is determined that the calling party has been registered in the pre-call registration list, checking whether a super access number corresponding to the calling number is set in the access number configuration information; if it is, initiating the call to the called party; otherwise, inquiring the called party whether to answer the call.

13. The method of claim 1, further comprising storing scene status parameter information of the called party in the access number configuration information; wherein during the call, the called party decides to enable the function of access number call, initiate the call to the called party or refuse to initiate the call to the called party according to the scene status parameter.

14. The method of claim 1, wherein,
the access number configuration information is stored in an SCP (Service Control Point), the corresponding pre-call registration record is added into the pre-call registration list in the SCP, and when the call request from the calling party is received, the SCP determines whether the calling party has been registered in the pre-call registration list.

15. The method of claim 1, wherein,
the access number configuration information is stored in a dedicated server, the corresponding pre-call registration record is added into the pre-call registration list in the dedicated server, and when the call request from the calling party is received, the dedicated server determines whether the calling party has been registered.

16. The method of claim 1, wherein the access number is sent to the calling number prior to initiating the call to the called party.

17. The method of claim 1, wherein the access number is independent of the called number of the called party such that the called party can change the access number without changing the called number.

18. The method of claim 1, wherein the access number is used to determine whether the calling party is authorized to call the called party.

19. An apparatus for processing a telephone call, the apparatus comprising:
a processor; and
a computer readable storage medium storing programming for execution by the processor, the programming including instructions to:
send an access number to a plurality of authorized calling parties of a called party, the access number being different than a called number of the called party;
receive a pre-call registration request from a calling party; and
determine whether the calling party is one of the plurality of authorized calling parties based on whether or not the pre-call registration request comprises the access number, wherein the calling party is one of the plurality of authorized calling parties if the pre-call registration request comprises the access number, wherein, the programming further includes instructions to:

responsive to determining that the calling party is one of the authorized calling parties, register the calling party in a pre-call registration list and, thereafter, initiate a call between the calling party and the called party; and responsive to determining that the calling party is not one of the authorized calling parties, refuse to initiate a call between the calling party and the called party.

20. The apparatus of claim 19, wherein the access number is independent of the called number of the called party such that the called party can change the access number without changing the called number.

21. The apparatus of claim 19, wherein the called number is a telephone number of the called party.

* * * * *